US009727538B2

(12) United States Patent
Clee et al.

(10) Patent No.: US 9,727,538 B2
(45) Date of Patent: Aug. 8, 2017

(54) EDITING A FRAGMENTED DOCUMENT

(75) Inventors: Scott J. Clee, Surbiton (GB);
Katherine M. Shann,
Walton-on-Thames (GB); Daniel E. Would, Eastleigh (GB); Shanna Xu,
Southampton (GB)

(73) Assignee: INTERNATIONAL BUSINESS MACHINES CORPORATION,
Armonk, NY (US)

( * ) Notice: Subject to any disclaimer, the term of this patent is extended or adjusted under 35 U.S.C. 154(b) by 594 days.

(21) Appl. No.: 13/313,515

(22) Filed: Dec. 7, 2011

(65) Prior Publication Data

US 2012/0151312 A1 Jun. 14, 2012

(30) Foreign Application Priority Data

Dec. 10, 2010 (EP) .................................... 10194499

(51) Int. Cl.
G06F 17/22 (2006.01)

(52) U.S. Cl.
CPC ...... G06F 17/2229 (2013.01); G06F 17/2235 (2013.01)

(58) Field of Classification Search
CPC ................. G06F 17/2211; G06F 17/30893
USPC .................................................. 715/202, 205
See application file for complete search history.

(56) References Cited

U.S. PATENT DOCUMENTS

| | | | |
|---|---|---|---|
| 5,649,218 A | 7/1997 | Saito | |
| 5,745,745 A | 4/1998 | Tada et al. | |
| 5,870,552 A * | 2/1999 | Dozier | G06F 17/3089 |
| | | | 707/E17.01 |
| 5,911,145 A * | 6/1999 | Arora | G06F 17/21 |
| | | | 707/E17.013 |
| 6,044,387 A * | 3/2000 | Angiulo et al. | 715/257 |
| 6,144,962 A * | 11/2000 | Weinberg | G06F 11/32 |
| 6,212,530 B1 | 4/2001 | Kadlec | |
| 6,964,013 B1 | 11/2005 | Ono et al. | |
| 7,096,423 B2 * | 8/2006 | Murata | G06F 17/24 |
| | | | 715/204 |
| 7,139,971 B1 | 11/2006 | Otsubo | |
| 7,228,496 B2 | 6/2007 | Hamada | |

(Continued)

OTHER PUBLICATIONS

CS.colostate.edu, Basic Emacs Editor Commands, Apr. 17, 2009, pp. 1-3 http://web.archive.org/web/20090417150924/http://www.cs.colostate.edu/helpdocs/emacs.html.*

(Continued)

*Primary Examiner* — Scott Baderman
*Assistant Examiner* — Mario M Velez-Lopez
(74) *Attorney, Agent, or Firm* — Lee Law, PLLC;
Christopher B. Lee (57) ABSTRACT

A user command selecting a whole or part of a discrete document of the fragmented document is received at a computing device. The fragmented document includes a group of discrete documents connected by a set of links, each link being located within one discrete document and connecting to another different discrete document. An edit command to edit the selected whole or part of the discrete document is received. Each other discrete document connected to the selected whole or part of the discrete document is accessed by a link within the selected whole or part of the discrete document. The accessed discrete documents are edited according to the edit command.

18 Claims, 6 Drawing Sheets

(56) References Cited

U.S. PATENT DOCUMENTS

| | | | |
|---|---|---|---|
| 7,933,952 B2 | 4/2011 | Parker et al. | |
| 8,078,979 B2* | 12/2011 | Howard | G06F 3/0481 |
| | | | 382/305 |
| 2002/0032869 A1* | 3/2002 | Lamberton | G06F 17/3089 |
| | | | 726/3 |
| 2003/0121008 A1* | 6/2003 | Tischer | G06F 17/2247 |
| | | | 715/255 |
| 2004/0019611 A1* | 1/2004 | Pearse | G06F 17/30887 |
| 2004/0039995 A1* | 2/2004 | Kuwata | G06F 17/24 |
| | | | 715/255 |
| 2005/0240869 A1* | 10/2005 | Leetaru | G06F 17/30861 |
| | | | 715/234 |
| 2006/0123337 A1* | 6/2006 | Koinuma | G06F 17/3089 |
| | | | 715/234 |
| 2006/0271840 A1* | 11/2006 | Murata | G06F 17/24 |
| | | | 715/209 |
| 2008/0052668 A1* | 2/2008 | Craig et al. | 717/111 |
| 2008/0195932 A1* | 8/2008 | Oikawa | G06F 17/212 |
| | | | 715/234 |
| 2009/0094579 A1* | 4/2009 | Na | G06F 17/211 |
| | | | 717/110 |
| 2009/0138810 A1* | 5/2009 | Howard | G06F 3/0481 |
| | | | 715/760 |
| 2010/0223541 A1* | 9/2010 | Clee | G06F 17/21 |
| | | | 715/205 |
| 2012/0072821 A1* | 3/2012 | Bowling | G06F 17/24 |
| | | | 715/229 |
| 2012/0151312 A1* | 6/2012 | Clee | G06F 17/2235 |
| | | | 715/205 |
| 2013/0265592 A1 | 10/2013 | Bellagamba | |

OTHER PUBLICATIONS

Yahoo Developer Network, Aug. 6, 2007, pp. 1-6 http://developer.yahoo.com/performance/rules.html.*

United States Patent and Trademark Office, Office Action for U.S. Appl. No. 13/434,610, May 8, 2014, pp. 1-22, Alexandria, VA, USA.

United States Patent and Trademark Office, Office Action for U.S. Appl. No. 13/434,610, Jan. 16, 2014, pp. 1-21, Alexandria, VA, USA.

United States Patent and Trademark Office, Examiner's Answer to Appeal Brief for U.S. Appl. No. 13/434,610, Jan. 30, 2015, pp. 1-34, Alexandria, VA, USA.

United States Patent and Trademark Office, Notice of Allowance for U.S. Appl. No. 13/434,610, Dec. 6, 2016, pp. 1-11, Alexandria, VA, USA.

* cited by examiner

EDITING A FRAGMENTED DOCUMENT

RELATED APPLICATIONS

This application claims priority to and claims the benefit of European Patent Application Serial No. EP10194499.9 titled "EDITING A FRAGMENTED DOCUMENT," which was filed in the European Patent Office on Dec. 10, 2010, and which is incorporated herein by reference in its entirety.

BACKGROUND

This invention relates to editing a fragmented document. In one embodiment, the invention recursively updates information in documents.

There are a large number of environments and formats that a user may use to store a document. For instance, a document may be a Microsoft® Word document stored in a user's desktop, or a web-based document stored in a database that may be accessed and updated through a website, such as a wiki. These examples show that the document is stored and accessed as a single entity.

In the web-based (or other equivalent networked) environment, what appears to be a single document may be composed of many fragments. This fragmentation is not visible to the user, only a single entity is perceived. However, although the document is physically distributed around a network, the user perceives a traditional document structure such as chapters, pages and paragraphs.

BRIEF SUMMARY

A method of editing a fragmented document includes receiving, at a computing device, a user command selecting a whole or part of a discrete document of the fragmented document, where the fragmented document includes a group of discrete documents connected by a set of links, each link being located within one discrete document and connecting to another different discrete document; receiving an edit command to edit the selected whole or part of the discrete document; accessing each other discrete document connected to the selected whole or part of the discrete document by a link within the selected whole or part of the discrete document; and editing the accessed discrete documents according to the edit command.

A system for editing a fragmented document includes a user interface arranged to receive a user command selecting a whole or part of a discrete document of the fragmented document, where the fragmented document includes a group of discrete documents connected by a set of links, each link being located within one discrete document and connecting to another different discrete document, and receive an edit command to edit the selected whole or part of the discrete document; and a processor programmed to access each other discrete document connected to the selected whole or part of the discrete document by a link within the selected whole or part of the discrete document, and edit the accessed discrete documents according to the edit command.

A computer program product on a computer readable storage medium for editing a fragmented document, including computer readable program instructions that when executed by a computer cause the computer to receive a user command selecting a whole or part of a discrete document of the fragmented document, where the fragmented document includes a group of discrete documents connected by a set of links, each link being located within one discrete document and connecting to another different discrete document; receive an edit command to edit the selected whole or part of the discrete document; access each other discrete document connected to the selected whole or part of the discrete document by a link within the selected whole or part of the discrete document; and edit the accessed discrete documents according to the edit command.

BRIEF DESCRIPTION OF THE SEVERAL VIEWS OF THE DRAWINGS

Embodiments of the present invention will now be described, by way of example only, with reference to the accompanying drawings, in which.

DETAILED DESCRIPTION

Figure 1:
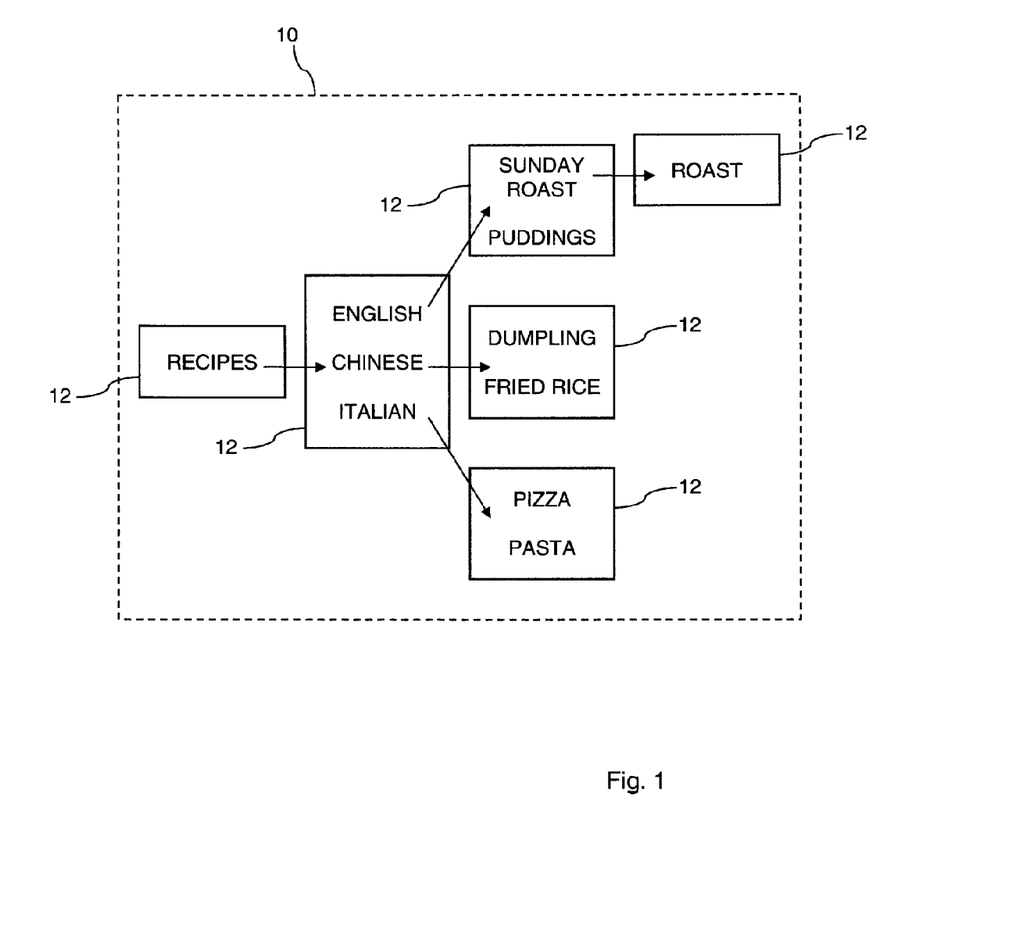
FIG. 1 is a schematic diagram of an example of an implementation of a fragmented document according to an embodiment of the present subject matter.

FIG. 1 shows an example of an implementation of a fragmented document 10 that includes a plurality of discrete documents 12. The discrete documents 12 are connected by one or more links. Each link is located in one discrete document 12 and connects to a different discrete document 12. A discrete document 12 may have more than one link, and multiple links in different discrete documents 12 may link to the same destination discrete document 12. Hypertext is a technology that may be used to embody the fragmented document 10 shown in FIG. 1. This technology allows text displayed on a computer screen to have links to other text that the reader may immediately access.

The fragmented document 10 shown in FIG. 1 is a "wiki." A wiki is a website that allows the creation and editing of any number of interlinked documents via a suitable browser using a markup language or a text editor. Wikis are typically powered by specific software and are often used to create collaborative wiki websites, for example community websites, in corporate intranets, and in knowledge management systems. Any user may access the pages of the wiki and may amend the pages, and may add new pages or delete existing pages. Any text within a discrete document 12 may be used as the basis for a hyperlink to another discrete document 12.

In the example of FIG. 1, the wiki is a repository of recipes, which have been organized into a hierarchical structure. The first page is a generic "Recipes" page, which may additionally carry information about the content of the wiki and the rules relating to the editing of the wiki. A second page includes a list of meal types "English," "Chinese," "Italian," and so on, and a user may navigate through these links to further pages with different headings, eventually navigating to specific recipes that have been created by users. This overall fragmented document 10 includes multiple individual discrete documents 12. A user may navigate back and forth between the discrete documents 12 using the links in the discrete documents 12.

The present subject matter allows an edit command, such as a find/replace function, to apply to linked content, thereby allowing the action of updating, for instance, an entire chapter, by merely selecting the chapter header. This allows convenient updating of information in one operation that is otherwise spread out, without the need to traverse backwards and forwards through a fragmented document. The present subject matter enables a user to, for example, find and/or replace partial and/or entire document content, from links, tags, and titles that lead to the content, without navigating through the links, tags, and titles.

For example, a user desires to update a butter brand referenced by the "Puddings" page as described above with reference to FIG. 1. By selecting the tag "Puddings" and using an edit command requesting a content find/replace, the present subject matter allows the user to update the entire contents of the section "Recipes" where the butter of brand is mentioned.

Additionally the user is able to select multiple discontinuous headers. For example, the user may select "English" and "Italian" links and the content find/replace function updates the contents of these two sections only. This provides significant productivity gain and accuracy, particularly when attempting to update similar information in existing discrete documents. For example, it may be that both "English" and "Chinese" pages are written by James, but the "Italian" page is written by John. The present subject matter enables a user to find/replace the author field for "English"/ "Chinese" and "Italian" separately.

The process may also be applied to code, such as through the code outline view in an Eclipse™ integrated development environment (IDE). A user may select one or more methods in the outline view, and provide an edit command to act on each of these selected methods. For example, in a program in which many methods reference the variable "user," it may be decided to differentiate those working on a generic user object, versus those working on an active user. In this case, the programmer may select all methods that are related to manipulating the active user and supply the edit command to replace "user" with "activeUser." Making the change in just the applicable subset aids in the differentiating of the different kind of methods.

The present subject matter also provides a mode of operation for content update, particularly in documents containing sub-links. This mode of operation may be used to provide the user with a method of choosing how to process those sub-links, by either ignoring them, finding the sub-content and embedding it in place at the point it is linked, or pulling the content to be added as an appendix referenced from its link point.

By these means, the find/replace function provided by the present subject matter solves an identified fragmented document problem in an innovative fashion. The novel techniques reduce or eliminate requirements for a user to understand the fragmented nature of a document.

The present subject matter further includes recursively accessing additional discrete documents connected to the other discrete documents by a link within the other discrete documents, and editing the accessed additional discrete documents according to the edit command. The edit command that a user provides may be recursively applied to any document that is linked from any sub-document to which the edit command is applied and so on in a repeating process. This ensures that the required change populates throughout the fragmented document that the user is editing.

The present subject matter further includes stopping the recursive accessing and editing of further additional discrete documents in response to satisfaction of a predefined criterion. A "maxdepth," as described below for recursion control, represents such a predefined criterion. Since it is possible that a discrete document within the fragmented document may have links to other documents external to the fragmented document, it is advisable that a limit be placed on the recursive nature of the application of the edit command. Otherwise it is conceivable that the recursion may be unlimited. A limit would be to only have a set number of rounds of recursion, such as five for example, which may be represented using a maxdepth variable. This would mean that once the process of applying the edit command to sub-documents has reached the fifth level of linked documents away from the original source, then the process is automatically stopped.

The received user command of selecting a whole or part of a discrete document of the fragmented document may include a selection of one or more links in the discrete document. As detailed above, the selection of a document to be edited may include the selection of a link to that document rather than the actual document itself. This supports a streamlined interface and also gives greater flexibility over the edit command, as the user may select discontinuous links when making their selection of the parts of the fragmented document that are to be edited.

The present subject matter also includes editing the selected whole or part of the discrete document according to the edit command. If the selection made by the user in the user command is an entire document or a part of a document, rather than one or more links, then it is possible to edit that selected portion first before any recursion is applied to documents linked from the selected portion. For example, the user may select a specific paragraph for editing and then instruct/invoke the edit command. This edit command is first applied to the selected paragraph and then applied recursively to any other documents that are linked from that paragraph.

It should be noted that conception of the present subject matter resulted from recognition of certain limitations associated with editing fragmented documents. For example, it was recognized that to update information contained within a large fragmented document, a user often needs to navigate in the document to one or multiple sections/titles/chapters. The most common situation, in the current operational environment, is for a document to be fragmented via hypertext transfer protocol (HTTP) and hypertext markup language (HTML) web-based facilities, for example a wiki document. It was further recognized that consequently, in a wiki environment or in a database system, a hyperlink may link to several hyperlinks or document links. For example, as shown in FIG. 1, to update the author in all relevant documents that are linked to by a top-level hyperlink "Recipes," a user needs to first update the "Recipes" page and additionally navigate to further pages. The user then right-clicks on "English," "Chinese," and "Italian" in order to update these linked pages. However, in order to update the content of "Sunday Roast," a user needs to navigate to a new page. The page "Sunday Roast" may further lead to a large range of roasting recipes. As such, it was recognized that, in order to update the "Roast" page, for example, a user needs to navigate to yet another page.

It was additionally recognized that other editing issues with such fragmented documents may arise. For example, a user may be editing the page "Sunday Roast" when they realize that the butter brand quoted in the recipe no longer exists. Furthermore, the brand may be referenced in all documents anchored from the top-level "Recipes" page. To remove the brand name, the user needs to first update the page "Sunday Roast" and then modify "Puddings" on the same page. The user then needs to find out which other pages list butter as an ingredient and update accordingly.

It was recognized that this makes the task time consuming and error prone. It was also recognized that, in the case of data organized on a wiki page, jumping forwards and backwards between page links in order to update all of the information may be tedious. In other words, the fragmented nature of what appears to be a single entity is exposed to the user. Further, the user has to be aware of the nature of the fragmentation (how and by what means) in order to employ the correct method to update the fragmented document. It was recognized that this is impractical for several reasons, such as that a user cannot be expected to know which other documents also require an update.

It was also recognized that one existing solution for recursively updating all the information from a web page is to use some Java™ programming language classes to get and update all of the sub-documents. However, it was observed that these Java™ programming language based solutions will require programming skills and knowledge of how the documents are organized. As such, it was concluded that, in the extant paradigm of fragmented documents, it is impossible for a non-expert user to update the whole document in a quick and simple fashion. The present subject matter improves editing of fragmented documents.

Figure 2:
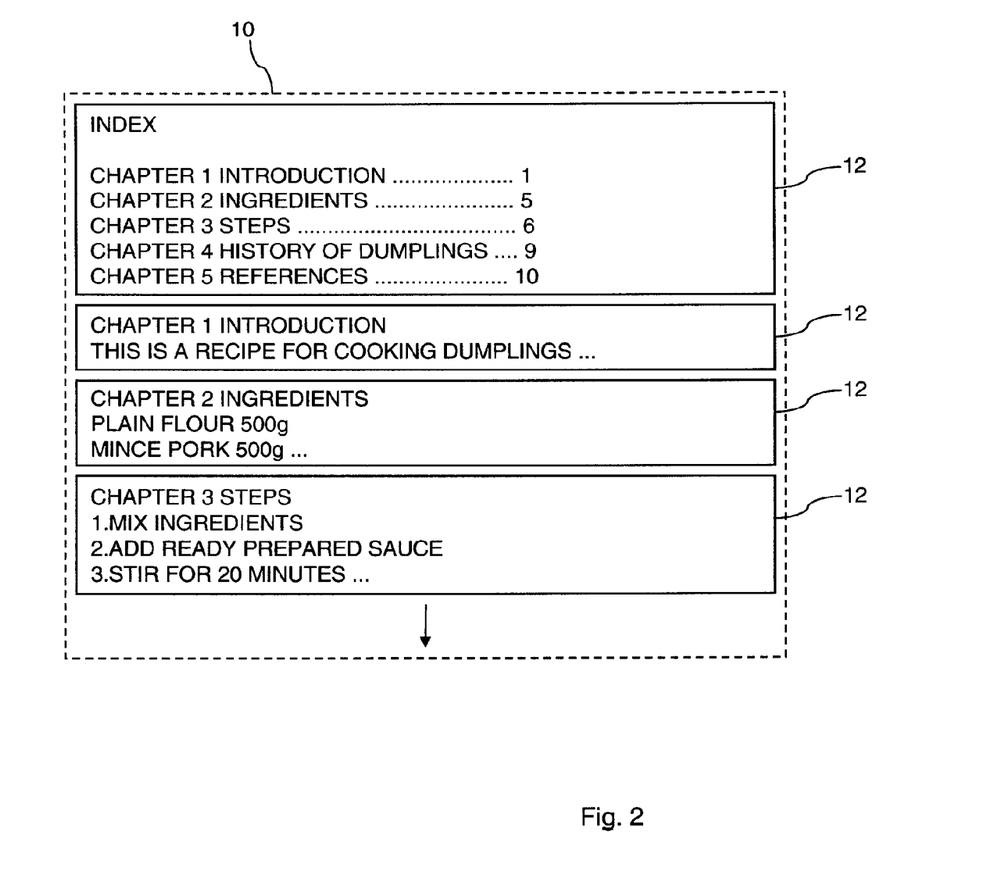
FIG. 2 is a schematic diagram of an example of an implementation of a different type of fragmented document that operates to provide editing of fragmented documents according to an embodiment of the present subject matter.

FIG. 2 shows an example of an implementation of a different type of fragmented document 10 that operates to provide editing of fragmented documents. The fragmented document 10 has an index 12 containing all the chapter headings, which is followed by the chapters 12 and their content. By selecting one or more chapter titles in the document index 12 and right clicking on the selected area, a list of options will be shown to the user. The system provides the option of a content find/replace edit function. Once this option is selected, a user may fill in a string for find and a string to replace. This updates the selected chapters in the fragmented document 10 in one single action, without the need to perform the same operation repeatedly on each chapter in turn.

For example, a user may select the "ingredients" chapter title, which is a link to the specific "ingredients" page 12, and right click. A list of options is shown to the user, and the user may select an option to find/replace linked content. By doing so, the "ingredients" page 12 is updated only. As a result of this operation, the various discrete documents 12 are located and retrieved, whether or not they are currently being seen by the user. In this way a user may perform an editing of one or more pages within a fragmented document regardless of where those pages are stored and without having to access each of the pages that are to be updated.

The "ingredients" page is shown as a single document 12, but may also contain links to yet further discrete documents 12 within the overall fragmented document 10. For example, individual ingredients may be presented as hyperlinks that a user is able to click on. The "mince pork" text on the ingredients page 12 may actually be a hyperlink that a user may click to move to a page detailing stock lists and alternatives for this ingredient. When the user selects the chapter heading for "ingredients" in the first page 12, then any edits that the user wishes to make will also be recursively carried out on the pages that are linked from the "ingredients" page.

The present subject matter provides technology that allows both read and write on hierarchical, or fragmented and linked documents. An editing method is provided that will allow a user to make an edit throughout the fragmented document in a single action.

Figure 3A:
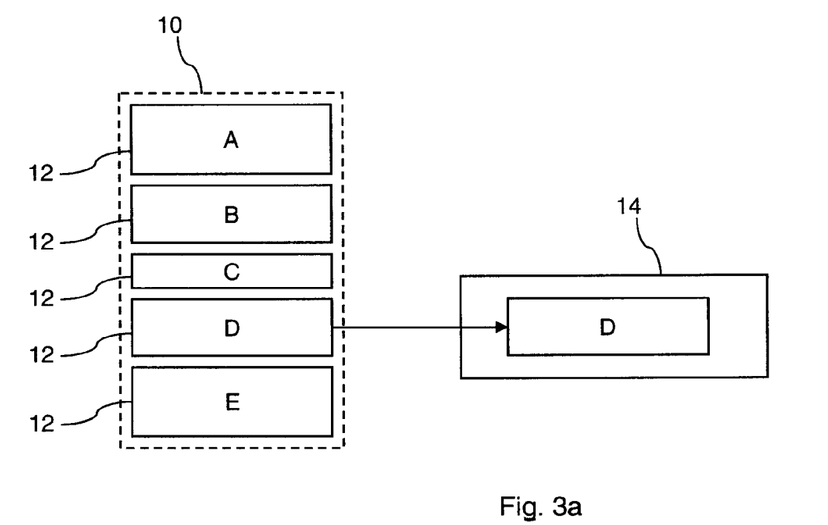
FIG. 3a and FIG. 3b are schematic diagrams of an example of an implementation of a further fragmented document, before and after editing, respectively, according to an embodiment of the present subject matter.
Figure 3B:
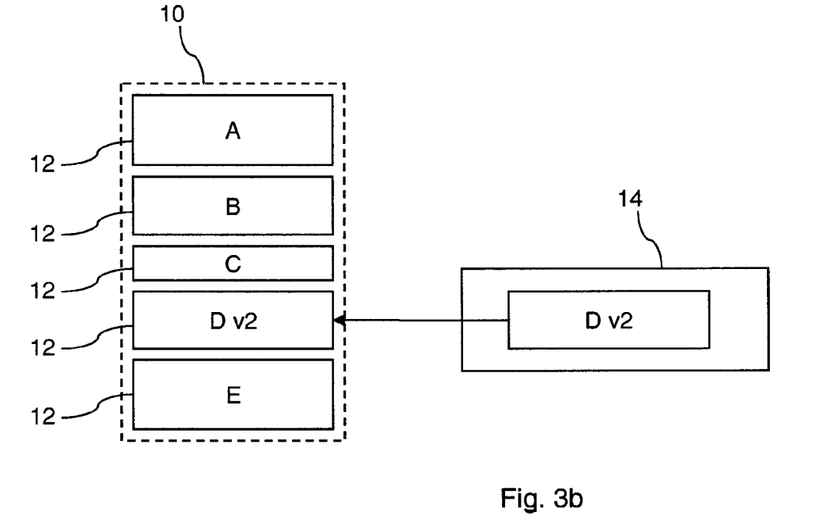

FIGS. 3a and 3b show an example of an implementation of an editing technique for fragmented documents. Within FIGS. 3a and 3b, a deep copy traverses the fragmented document 10 hierarchy and retrieves the content, (page D in FIG. 3a) that was selected from the structure view (in page A), to the level of recursion defined by the user. This content is stored in a modified buffer 14, or clipboard that associates metadata describing the hierarchy and source information with the content that is stored in the modified buffer 14. Once the user-defined edit operation (or multiple operations), for example a find and replace operation, has completed, the content (now D version 2 (v2) in FIG. 3b) from the modified buffer/clipboard 14 is replaced back into the hierarchical document structure 10. Effectively all of the required content is cut and pasted to the modified buffer 14, edited and then copied back to the correct location.

It was additionally recognized that, in order to achieve the editing function, a more complex model is required, in which the original location and structure is preserved in memory and navigated to perform the update before navigating again to re-write the content to the original locations. Below is high level pseudo-code to give an example of the operations carried out according to the present subject matter:

```
get_selection(selectionList){
for each item in selectionList:
stream = item.getStream( )
buffer = stream.read( )
buffer.setOrigLocation(item.location)
if curdepth < maxdepth:
{
contentLinks = item.getContentLinks( )
curdepth++
newBuffer(get_selection(contentLinks))
buffer.addLinkedBuffer(newBuffer)
curdepth --
return buffer
}
PerformReplace(origstr,newstr,buffer)
{
buffer.replace(origstr,newstr)
linkedBuffers = buffer.getLinkedBuffers( )
for each buffer in linkedBuffers:
PerformReplace(origstr,newstr,buffer)
}
WriteBuffersBackToSouce(Buffer)
{
stream = buffer.getOrigLocation( ).open( )
stream.write(buffer)
linkedBuffers = buffer.getLinkedBuffers( )
for each buffer in linkedBuffers:
WriteBuffersBackToSource(buffer)
}
}
```

The above pseudo-code is in effect a method "get_selection" for the variable "selectionList," this being the selection that the user has made, such as a group of chapter headings or a chunk of text containing links. The method then cycles through each "item" in the received user selection list, where each item may be considered to be each link in the user's selection. The next two lines of the pseudo-code "stream= . . . " and "buffer= . . . " define the accessing of the content defined by the current "item" (link) and the writing of that content to a buffer.

The step in the method of "buffer.setOrigLocation(item.location)" captures the location of the content connected by an item (link). This location may be considered to be a path to the content.

A test is then made in relation to two variables "curdepth" and "maxdepth." The former may be considered to be the current depth in terms of the recursive iteration of the links that have been navigated. In the user's selection, navigating a link in that selection moves the current depth to one (1). Navigating a further link will set the current depth to two (2), and so on. The "maxdepth" variable is the user's setting of the maximum level of recursion (e.g., the predefined criterion) that is to be used in the acquiring of the text. This variable may be set to one (1), in which case the method will terminate straightaway. However, this is more likely to be set at a value of five (5), for example.

If the current depth is less than the maximum depth, then the next line of the method "contentLinks= . . . " acquires the links within the current item. The current depth is then incremented.

The next two new steps include a first new step "newBuffer . . . " that creates a new buffer for the content acquired from the link rather than appending it to an existing buffer. This is to ensure that the existing structure of the data may be preserved. The next new step "buffer.addLinkedBuffer . . . " adds this new buffer to the existing structure of buffers. In effect a structure of buffers is created that mirrors the original content, in relation to the links in that content. The variable "maxdepth" again represents a predefined criterion.

There are then added two additional routines to the method. The first is a "PerformReplace . . . " function that takes an existing string and a new string, and works through the buffer structure created as per the paragraph above to perform a find and replace function on the specific string. Each instance of that string is found in all of the buffers that have been created corresponding to the original content. Wherever the string is found, it is replaced with the new string. Once each buffer has been accessed in turn, then this routine will terminate.

The second additional routine is a "WriteBuffersBackToSource . . . " function that writes back the now-amended (edited) text to the correct original locations. Each buffer is accessed in turn, and the content of that specific buffer is then written back to its original source, using the location information (the path details) that was acquired, as detailed above. In this way, the contents of the buffers are read out and written into the locations from which the text was originally taken to create a buffer. This results in the amended/edited text over-writing the old text, all of which is carried out in an automated fashion.

Each accessed document is read as text into the buffer structure and the original location of each accessed document is recorded. The text is amended in the buffer structure according to the user's edit command and the text is written back from the buffer structure to the accessed documents using the recorded location information.

Figure 4:
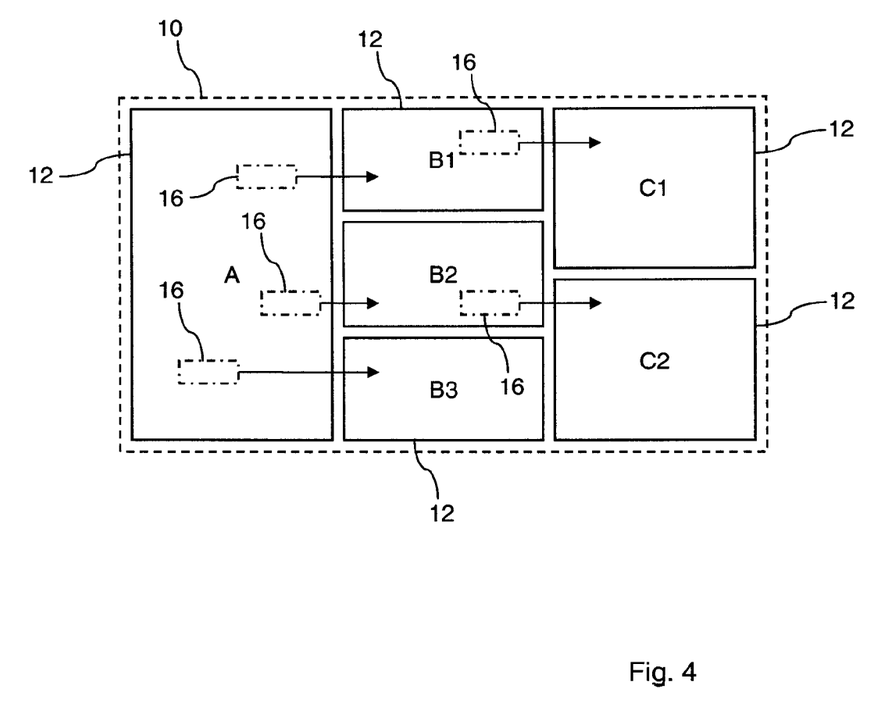
FIG. 4 is a schematic diagram of an example of an implementation of a yet further fragmented document, showing links within the document according to an embodiment of the present subject matter.

FIG. 4 shows an example of an implementation of a different fragmented document 10, which comprises six individual discrete documents 12. Although the fragmented document 10 is shown as a unitary whole, the different discrete documents 12 may be stored in different locations and only form part of the same overall fragmented document 10 by virtue of the links 16 between the different discrete documents 12. The discrete document "A" may be considered the top-level discrete document 12 with links to three second-level discrete documents 12, labelled "B1," "B2," and "B3." There are two further third-level discrete documents 12, which are labelled "C1" and "C2." Document "B1" has a link 16 to document "C1" and document "B2" and a link 16 to document "C2."

The links 16 are hypertext links that a user may click on when viewing the specific discrete document 12 to navigate through to the next level of document, according to the specific link. The hierarchy of discrete documents 12 is logical, there is no difference between discrete documents 12 of the different "levels" from a logical perspective. The example shown in FIG. 4 is an example arrangement of discrete documents 12. In many real-world examples of such fragmented documents 10, there may be many hundreds of discrete documents 12 with a complicated inter-connection of links 16, with links going in any direction linking any discrete documents 12 together. Such structures of fragmented documents 10 may exist in company intranets and collaboration websites on the Internet.

If a user wishes to edit the fragmented document 10, then the method described above is suited to saving the user time and resources as they will be able to perform an editing function on the top-level discrete document "A" and choose whether that edit should be recursively applied to any other discrete document 12 that is linked from the top-level discrete document "A." The user may perform the edit only on the discrete document "A" or choose to have that edit applied to the linked documents, in this case the second-level discrete documents "B1," "B2," and "B3." If the user chooses to have the edit command recursively applied, then the dependent discrete documents 12 are also edited in the same manner as the main discrete document 12.

Figure 5:
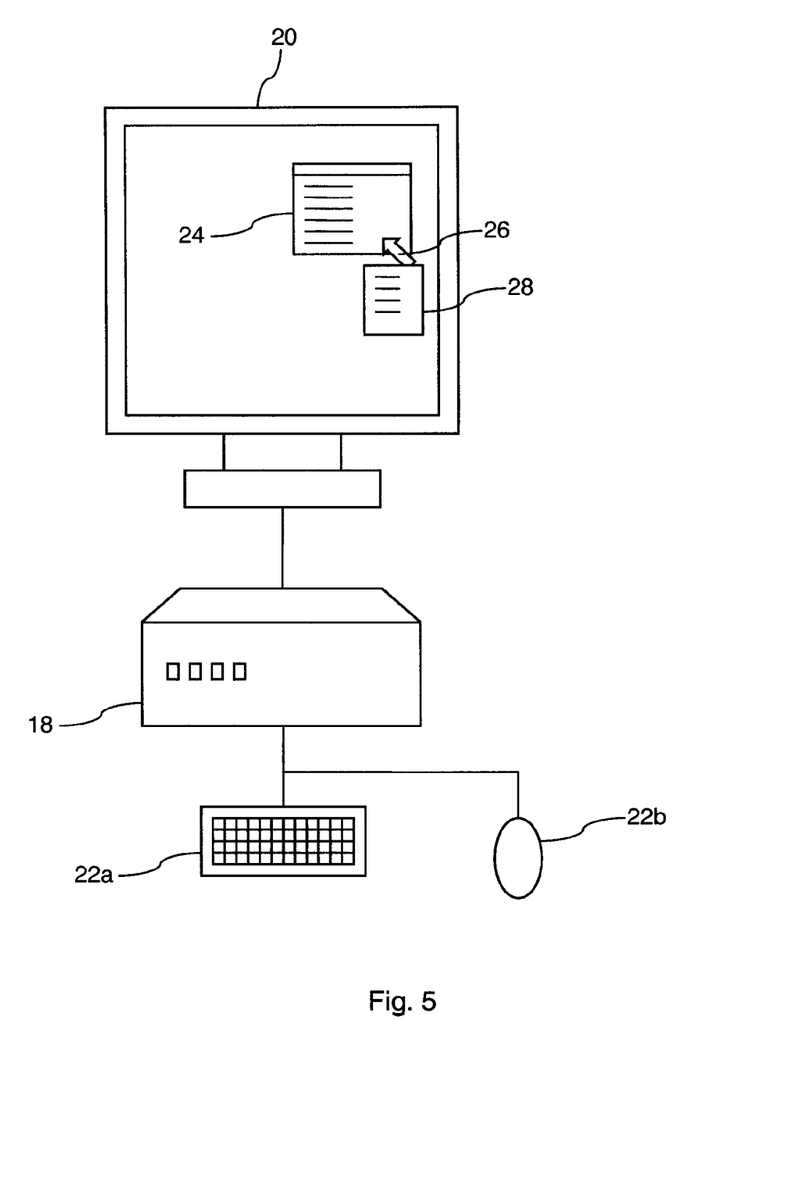
FIG. 5 is a schematic diagram of an example of an implementation of a computing system for editing fragmented documents according to an embodiment of the present subject matter.

FIG. 5 is a diagram of an example of an implementation of a computing system for editing fragmented documents as described herein. The computing system comprises a processing device 18, display device 20, and user interface devices 22a and 22b. The user interface devices are a keyboard 22a and a mouse 22b. The computing system shown in FIG. 5 may be implemented as a desktop computer, and may be composed of discrete components that are locally located, but may equally be a device such as a laptop computer or suitably enabled handheld device such as a mobile phone. Similarly, the computing system may comprise part of a networked or mainframe computing system, in which case the processing device 18 may be located remotely from the user input devices 22a and 22b, and from the display device 20, or indeed may have its function distributed among separate devices.

An application represented by the window 24 may be a web browser for example. Within the present example, the user is browsing a wiki, which is displayed as text in the window 24. Some of the text will include hyperlinks, as described above. The content of the wiki is stored remotely from the processing device 18, and as the user navigates content within the wiki, new pages will be loaded by the processing device 18 from the remote location and then displayed to the user via the application window 24. Each time a user clicks on a link in the application window 24 with a cursor 26, a new page of the overall fragmented document 10 (the wiki) will be loaded for the user to continue browsing.

The user also has the option to right click, either on a specific link 16 within the document being viewed, or just anywhere within the text being displayed by the application window 24. The action of right clicking on the mouse 22b will call up a menu 28 that may form a portion of a desktop OS implementation. The menu 28 will give the user various editing options that may be selected by the user by performing further user interface actions via the keyboard 22a or mouse 22b. The user may select an option within this menu 28 that will provide the functionality to populate any changes made via an edit command to the further discrete documents that are referenced by the current page being displayed in the application window 24.

Figure 6:
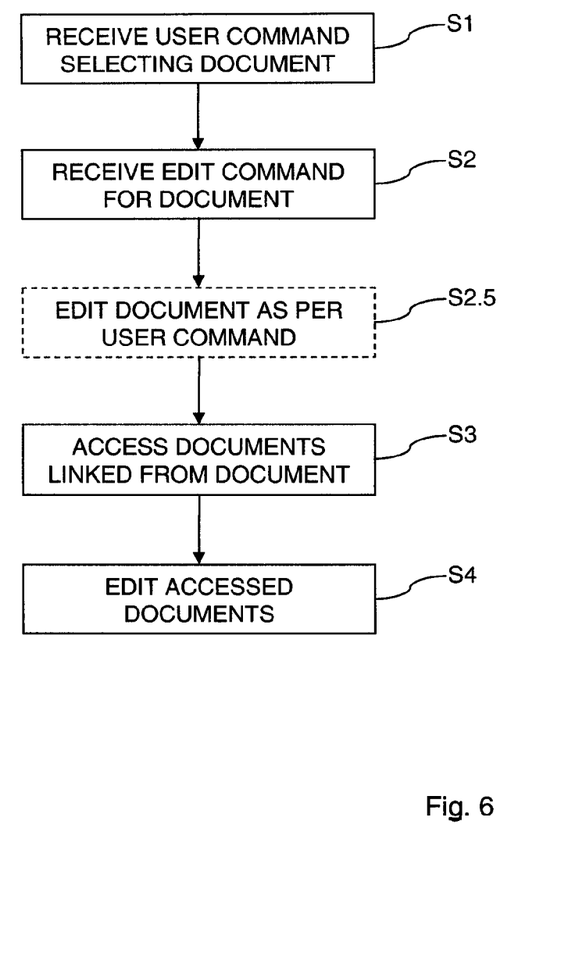
FIG. 6 is a flowchart of an example of an implementation of a method/process of editing a fragmented document according to an embodiment of the present subject matter.

FIG. 6 is a flow chart of an example of an implementation of a method/process of editing the fragmented document 10. For purposes of the present example, the fragmented document 10 includes a plurality of discrete documents connected by one or more links, each link being located within one discrete document and connecting to a different discrete document. The different discrete documents that make up the overall fragmented document 10 may be distributed at different locations and the individual discrete documents are not normally loaded until the user requests to view a specific discrete document, for example by navigating by a hyperlink. The processing device 18 that is running the application that the user is using to access the document manages the recall and loading of the individual documents.

The method includes the steps of step S1, which includes receiving a user command selecting a whole or part of a discrete document of the fragmented document 10. The selection may be of an entire document, part of a document, or one or more links within the document. The user will indicate that they wish to edit part of the overall fragmented document 10, for example, by performing a right-click action in a graphical user interface where they are viewing the document, as detailed above. This action may be with respect to a specific discrete document as a text document of one or more links to other specific discrete documents, where the links have first been selected by the user.

The next step is step S2, which includes receiving an edit command to edit the selected whole or part of the discrete document. This edit command may be a find and replace function, for example. The next step S2.5 is optional and includes the step of editing the selected whole or part of the discrete document according to the edit command. If the user selected one or more links, then this step is omitted. However, if the user selected an entire document or a portion of the document that includes text and links, then the selected portion of text is itself edited according to the user's edit command.

The method continues with step S3, which includes accessing each other discrete document connected to the selected discrete document by a link within the selected discrete document, and the method continues at step S4, which includes editing the accessed discrete documents according to the user command.

In this way, the edit command selected by the user populates through to the next level in the document hierarchy, and this process may continue recursively until complete, or may continue recursively for a pre-determined number of levels. The user has the advantage that only one edit command needs to be made and the user does not have to go to the trouble of loading further linked documents in order to edit those documents.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for editing a fragmented document, comprising:
 a user interface arranged to:
  receive a user command selecting a whole or part of a discrete document of the fragmented document, where the fragmented document comprises a plurality of discrete documents connected by a plurality of links, each link being located within content of one discrete document and connecting to another different discrete document, where the plurality of links allow processor navigation back and forth between discrete documents of the plurality of discrete documents during processor editing operations on the plurality of discrete documents; and
  receive an edit command to edit the selected whole or part of the discrete document; and
 a processor programmed to:
  access, using the plurality of links that connect the plurality of discrete documents in response to receiving the edit command, each other discrete document connected to the selected whole or part of the discrete document; and
  edit the accessed other discrete documents according to the edit command.

2. The system according to claim 1, where the processor is further programmed to recursively access additional discrete documents connected to the other discrete documents using a link within the other discrete documents, and edit the accessed additional discrete documents according to the edit command.

3. The system according to claim 2, where the processor is further programmed to stop the recursive accessing and editing of further additional discrete documents in response to satisfaction of a pre-defined criterion.

4. The system according to claim 1, where the processor is further programmed to edit the selected whole or part of the discrete document according to the edit command.

5. The system according to claim 1, where the received user command selecting the whole or part of the discrete document of the fragmented document comprises a selection of one or more links in the discrete document.

6. The system according to claim 1, where, in being programmed to access, using the plurality of links that connect the plurality of discrete documents in response to receiving the edit command, each other discrete document connected to the selected whole or part of the discrete document and edit the accessed other discrete documents according to the edit command, the processor is programmed to:
- read each accessed other discrete document as text into a buffer structure;
- record original location information of each accessed other discrete document;
- amend the text in the buffer structure according to the edit command; and
- write back the amended text from the buffer structure to the accessed other discrete documents using the recorded original location information.

7. The system of claim 1, where:
- the user interface is further arranged to receive a user command comprising a selected list of discontinuous links to multiple distributed discrete documents that form a portion of the fragmented document; and
- the processor is further programmed to:
  - access the multiple distributed discrete documents that form the portion of the fragmented document using the selected list of discontinuous links; and
  - edit the accessed multiple distributed discrete documents according to the edit command.

8. The system of claim 1, where the fragmented document comprises program code and the plurality of discrete documents comprise a plurality of discrete program code documents.

9. The system of claim 1, where:
- the user interface is further arranged to receive a user command that specifies to pull sub-content referenced at a location within a first discrete document by a sub-link within the first discrete document to another discrete document; and
- the processor is further programmed to:
  - find the sub-content within the other discrete document; and
  - one of:
    - embed the sub-content within the first discrete document in place of the sub-link at the location of the sub-link within the first discrete document; and
    - add the sub-content as an appendix referenced from the location of the sub-link within the first discrete document.

10. A computer program product on a non-transitory computer readable storage medium for editing a fragmented document, comprising computer readable program code instructions that when executed by a computer cause the computer to:
- receive a user command selecting a whole or part of a discrete document of the fragmented document, where the fragmented document comprises a plurality of discrete documents connected by a plurality of links, each link being located within content of one discrete document and connecting to another different discrete document, where the plurality of links allow computer navigation back and forth between discrete documents of the plurality of discrete documents during computer editing operations on the plurality of discrete documents;
- receive an edit command to edit the selected whole or part of the discrete document;
- access, using the plurality of links that connect the plurality of discrete documents in response to receiving the edit command, each other discrete document connected to the selected whole or part of the discrete document; and
- edit the accessed other discrete documents according to the edit command.

11. The computer program product according to claim 10, where the computer readable program code instructions when executed by the computer further cause the computer to recursively access additional discrete documents connected to the other discrete documents using a link within the other discrete documents, and editing the accessed additional discrete documents according to the edit command.

12. The computer program product according to claim 11, where the computer readable program code instructions when executed by the computer further cause the computer to stop the recursive accessing and editing of further additional discrete documents in response to satisfaction of a pre-defined criterion.

13. The computer program product according to claim 10, where the computer readable program code instructions when executed by the computer further cause the computer to editing the selected whole or part of the discrete document according to the edit command.

14. The computer program product according to claim 10, where the received user command selecting the whole or part of the discrete document of the fragmented document comprises a selection of one or more links in the discrete document.

15. The computer program product according to claim 10, where, in causing the computer to access, using the plurality of links that connect the plurality of discrete documents in response to receiving the edit command, each other discrete document connected to the selected whole or part of the discrete document and edit the accessed other discrete documents according to the edit command, the computer readable program code instructions when executed by the computer cause the computer to:
- read each accessed other discrete document as text into a buffer structure;
- record original location information of each accessed other discrete document;
- amend the text in the buffer structure according to the edit command; and
- write back the amended text from the buffer structure to the accessed other discrete documents using the recorded original location information.

16. The computer program product of claim 10, where the computer readable program code instructions when executed by the computer further cause the computer to:
- receive a user command comprising a selected list of discontinuous links to multiple distributed discrete documents that form a portion of the fragmented document;
- access the multiple distributed discrete documents that form the portion of the fragmented document using the selected list of discontinuous links; and
- edit the accessed multiple distributed discrete documents according to the edit command.

17. The computer program product of claim 10, where the fragmented document comprises program code and the plurality of discrete documents comprise a plurality of discrete program code documents.

18. The computer program product of claim 10, the computer readable program code instructions when executed by the computer further cause the computer to:
- receive a user command that specifies to pull sub-content referenced at a location within a first discrete document by a sub-link within the first discrete document to another discrete document;
- find the sub-content within the other discrete document; and
- one of:
  - embed the sub-content within the first discrete document in place of the sub-link at the location of the sub-link within the first discrete document; and
  - add the sub-content as an appendix referenced from the location of the sub-link within the first discrete document.

\* \* \* \* \*